Patented Oct. 22, 1929

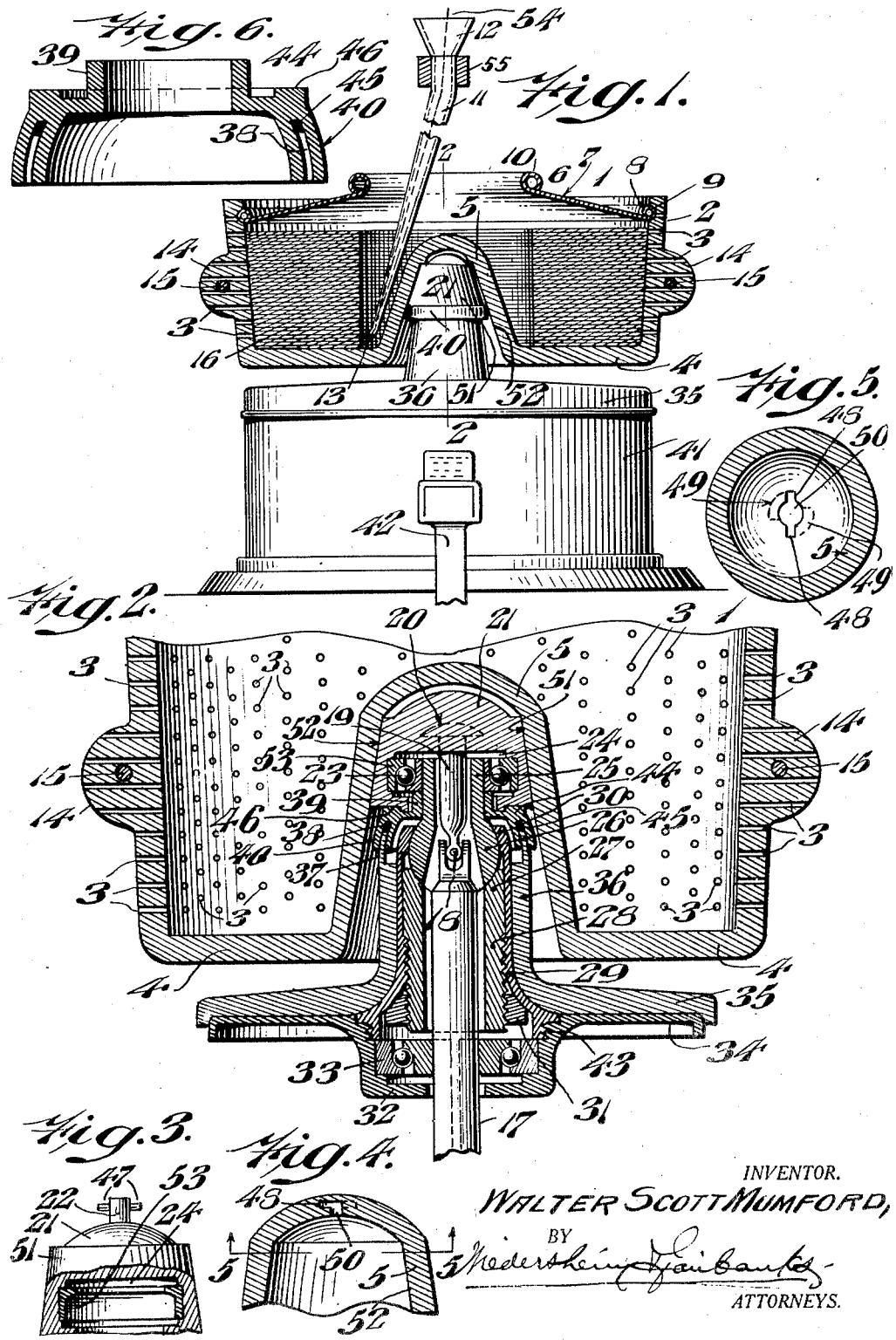

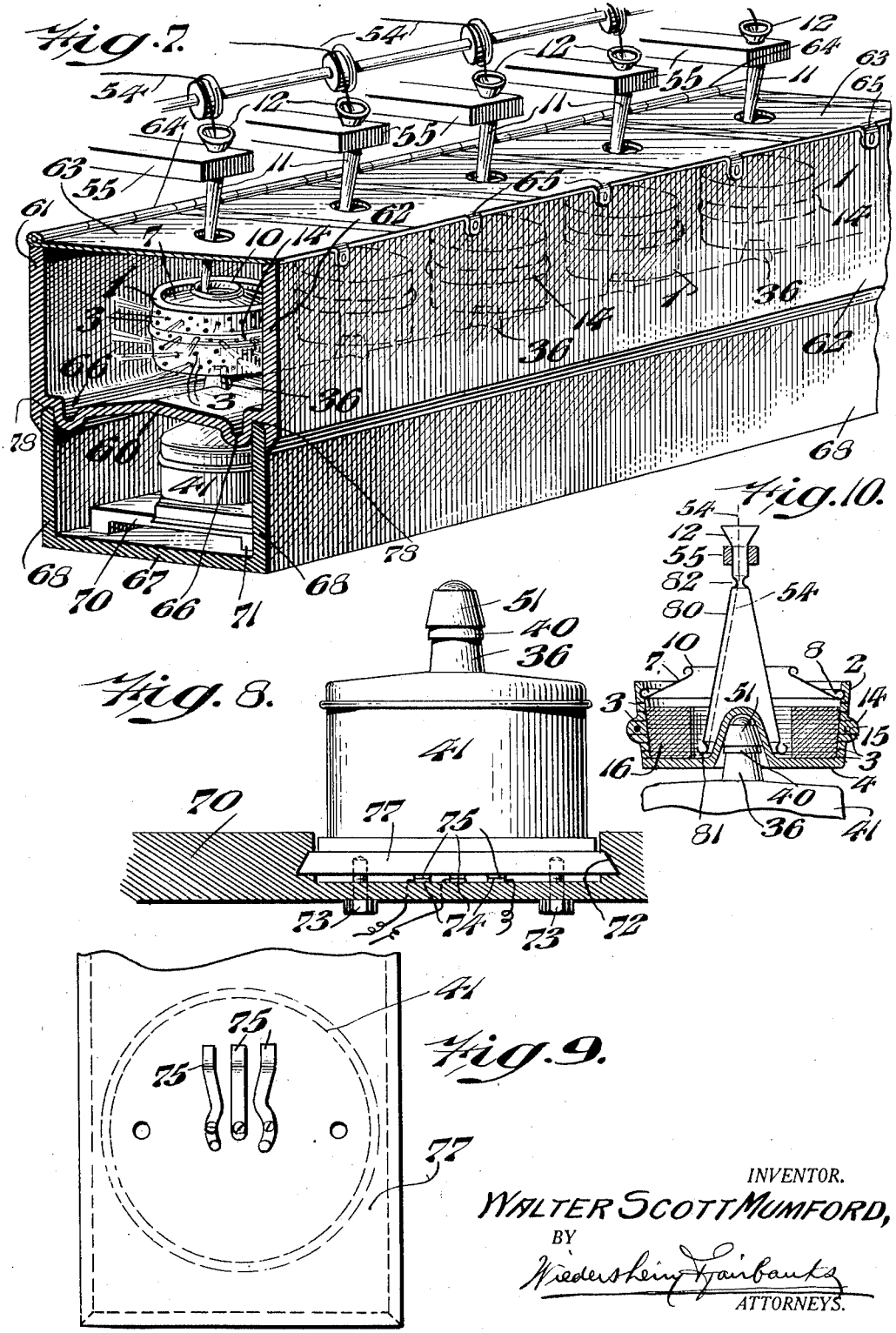

1,732,526

UNITED STATES PATENT OFFICE

WALTER SCOTT MUMFORD, OF PHILADELPHIA, PENNSYLVANIA

SPIN POT AND ACTUATING MECHANISM THEREFOR

Application filed May 1, 1928. Serial No. 274,226.

The operation of spin pots known and used heretofore for the manufacture of artificial silks and similar processes has been inefficient and uneconomical due to the vibration of such spin pots during acceleration and revolution at maximum speed, which is due to inherent or resultant unbalancing of the spin pot and its adjuncts as well as to extraneous unbalancing and disturbing forces to which a revolving spin pot of this character is ordinarily subjected. This vibration of the spin pot has resulted in various disadvantages among which are a rapid deterioration of parts, excessive power consumption, reduction of the speed limit or maximum R. P. M. attainable, and a nonuniform twisting of the yarn produced, which is commonly known in the trade as striation.

The object of my invention is to produce a spin pot which is free from vibration and which may be revolved at maximum speed, producing at the same time a uniformly twisted yarn at minimum cost of operation and maintenance.

My invention further consists in a novel spin pot having a central inverted cup-shaped formation whereby said spin pot may be operatively instantly centered and positioned upon the flexible driving shaft, the spherical bearing, the stationary support and their adjuncts.

My invention further consists in providing a conical or tapering supporting bearing which is detachably keyed to or frictionally held in the uppermost point of said inverted cup formation and which has its lower end rigidly connected to a flexible driving shaft, said bearing being of an external shape or contour to correspond with and conform to the internal contour or shape of said inverted cup shaped formation positioned in the body of said spin pot, whereby the latter is afforded a maximum frictional seating contact to prevent the vibration or wabbling of said spin pot with respect to said shaft.

My invention further consists of a pot whose base is re-entrant or provided with an inverted cup-shaped formation in which the actuating shaft and supporting bearings are positioned, whereby the overall height of the assembled spin pot and its adjuncts is greatly reduced.

My invention further consists of a spin pot composed of or covered with acid resisting material, such as bakelite and similar substances to guard against wear and corrosion otherwise resulting from the necessary exposure of metallic spin pots to the action of acids and other corrosive compounds ordinarily employed in industrial processes.

My invention further consists in a novel sealing construction for the driving shaft and bearings and their adjuncts to prevent the corrosive gases from attacking the metallic parts composing the internal structure of the bearings.

My invention further consists in a novel construction of driving mechanism, whereby I am enabled to employ one standard spin pot supporting and driving mechanism upon which spin pots of different sizes may be detachably supported without alteration of the driving or balancing systems or mechanisms, said spin pot being detachably keyed to or in frictional engagement with the upper end of the driving shaft and its bearing.

It further consists in a novel manner of positioning the servel in offset relation to the spin pot to conform to the novel shape of the spin pot embodying my invention.

It further consists in a novel manner of enclosing a battery of spin pots and motors, so that the acids extracted from the goods being treated, will be saved and automatically returned to any desired point.

It further consists of the novel features of construction and advantage hereinafter described and claimed.

To the above ends my invention consists in a novel spin pot having a central balancing mass, a flexible driving shaft for revolving said spin pot, a spherical bearing and a stationary support, having a socket for receiving said spherical bearing to produce a universal joint, said spherical bearing being positioned below and in proximity to said balancing mass to permit of limited gyration of the spin pot under the effect of disturbing or unbalancing conditions to which said spin pot may be subjected during operation, to prevent detrimental vibration.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Fig. 1 represents a vertical sectional view of an electrically driven spin pot for rayon yarn spinning and the like, a portion of the actuating mechanism being shown in elevation.

Fig. 2, represents, on an enlarged scale, a sectional view of the bottom of the spin pot and the actuating mechanism employed, the section being taken on the line 2—2 of Fig. 1.

Fig. 3, represents a side elevation of the driving head partly in section.

Fig. 4, represents a sectional view of the bayonet joint connection in the spin pot.

Fig. 5, represents a section on line 5—5 of Fig. 4.

Fig. 6, represents on an enlarged scale a sectional view of the seal. Figs. 7 to 9 represent details and Fig. 10 represents a modified construction.

In carrying out my invention I provide the spin pot 1 having the upwardly and outwardly inclined wall 2 provided with the drain ports 3 and the base 4 having its lower central re-entrant portion formed into the shape of an inverted conical cup as indicated at 5. 6 designates the pot cover, which is composed of the inclined sheet or wall 7 having the lower annular bead 8 which is seated in an annular recess 9, said wall 7 terminating in the upper annular bead 10, forming an opening for the introduction of the silk servel 11, which is funnel shaped at its upper extremity 12 which is mounted in a suitable movable support or bracket 55 and tapers therefrom down to the point 13. 14 designates the enlarged annular bead or mass positioned coincident with the horizontal axis of the revolving mass of pot 1 and the bearing 23, as will be understood from Figs. 1 and 2, and if desired the mass or weight of the material may be increased by the addition of a metallic ring 15, which may be cast into the annular bead 15 during the construction of the pot by any suitable means, said pot being preferably composed of bakelite phenol condensate, or any other suitable acid resisting material. 16 designates the silk cake within the rotatable pot showing the approximate position the same assumes when the device is in operation, up to speed. It will be understood that the rotation of the pot 2 at the requisite high speed can be effected by any suitable means, and in Fig. 2 I have shown in detail one preferred construction which may be employed. The actuating or driving spindle can be rotated from any suitable source of power, but in practice I prefer to employ the motor spindle 17, which may be an electric motor spindle or an extension thereof, having at its upper end the universal or spring flexible joint 18, whereby the short extension shaft and center 19 can be rotated, said latter shaft having a head 20 secured in the driving head 21, formed preferably of bakelite or the like, the latter having a drive key of a bayonet socket type 22 which engages the central portion of the inverted cup shaped member 5.

23 designates the upper ball bearing which is positioned in the ball bearing chamber 24 of the driving head 21 and coincident to the horizontal axis of the pot, said ball bearing encircling the upper portion of the sleeve 25, whose lower end terminates in the ball 26 which moves about the center 18, said ball being mounted upon the upper curved end or seat 27 of the sleeve 28, which is in threaded engagement with the shell 29, whose upper end 30 has an inner curved seat which receives and engages the upper portion of the ball 26, whereby the latter is effectively provided with upper and lower seats or bearings. The members 28 and 29 are in threaded engagement and are held in assembled position by the nut 31. 32 designates the lower base member which supports the lower ball bearing 33, said base member being provided with an end shield 34 which supports the lateral flange 35 of the upper outer stationary sleeve 36. The lower portion of the shell 29 is threaded into the end shell 34 as at 43. The outer bakelite sleeve 36 has the annular upwardly extending guide flange 37, which engages the annular bottom groove 38 in the member 40—which depends from the ring 39, the parts 39 and 40 being integral, as will be understood from Figure 6, and forming the seal.

41 designates the motor casing preferably of bakelite which may be provided with the terminal conduit 42 for the motor leads to the power circuit. The electric motor is preferably employed for constant speed.

The seal which is indicated at 44, in Figs. 2 and 6 and which is composed of the ring member 39 and the pendant integral portion 40 having the annular rubber washer or gasket 45 in the upper portion of the groove 38 is preferably made of bakelite or the like, and the top surface 46 forms a seal against the bottom of the bakelite driving head 21 as will be understood from Figure 2.

The bayonet joint connection between the parts 5 and 22 will be best understood from Figs. 3 to 5. The member 22 is provided with the transverse pin 47 which engages the diametric slots 48, best seen in Figure 5, said slots merging into the recesses 49, so that upon the insertion of the member 22 and the pin 47 into the hole 50, and the slots 48, and then giving the spin pot a slight turn, the parts will be detachably interlocked, which enables spin pots of different sizes and capacities to be readily removed from or connected with a driving head 21 and its adjuncts which can be of one standard uniform size.

The driving head 21 has its lower periphery 51 conical so as to make it snug and exact fit with the contacting wall 52 on the inner portion 5 of the spin pot, it being apparent that the spin pot is instantly centered upon the driving head 21 after it is placed in position thereon, as will be apparent from Figures 2, 3 and 4.

As heretofore explained, the guiding head 21 can be of bakelite and during the formation of the same I may cast the upper outer ball bearing member 23 directly therein, as will be understood from Figure 3, which greatly facilitates assembly of the upper ball bearing and its adjuncts, as is evident.

54 designates the artificial silk thread which is fed into the servel 12 which is supported by the movable arm 55.

In the construction shown in Figure 2 it is apparent that all external surfaces of the rotatable and stator parts may be made of bakelite or similar formaldehyde condensate material that resists corrosion occasioned by acid laden atmosphere in which the rotor and stator parts of the unit operate. This novel construction effectually seals the metal driving mechanism as will be apparent from Figs. 2 and 6. The seal 44 does not rotate but oscillates against the rubber cushion 45 if any gyratory movement occurs during the accelerating period from zero to determined speed. This gyratory period may occur during acceleration and the gyration will be about the center of the flexible joint 18 or a flexible spring joint member on the surfaces of the spherical shaped part 26. If any discrepancy of radial forces exist, at that time during acceleration when the determined high speed is attained, the rotatable pot acquires a fixed horizontal axis and plane and as long as the disturbing forces are minor to the revolving mass as the parts 14 and 15, it remains in that plane.

The offset servel 11 permits of a vertical oscillation free from contact of inverted part 5 and cover 10 and is operative after the pot 1 has attained required speed and permits of the silk cake being formed in a manner now used by the manufacturers of artificial silk and the like of other processes.

By positioning the driving and supporting elements and their adjuncts within the inverted cup shaped member 5, which is projected upwardly within the spin pot body to a point at or slightly above its mid height, I materially reduce the overall height of the assembled spin pot and motor, as will be apparent from Figures 1 and 7. By placing the balancing mass 14 in the same horizontal plane as the bearings 23 around which the pot rotates I greatly minimize the tendency of said pot to vibrate or wabble since the driving force actuating the pot is exerted upon the central mass thereof, as will be apparent from Figure 2. It will also be seen that any vibrations of the spin pot with respect to its actuating shaft, are transmitted through the contacting, driving head 21, and the driving shaft 19 to the pivot point 18 which is at the center of the flexible spherical bearing 26, which latter is below the center of the balancing mass 14 on the revolving spin pot, whereby said vertical vibrations are translated into processional gyrations.

In addition to reinforcing the construction, the balancing mass 14 serves to stabilize the spin pot and retain the latter in a horizontal plane, since it employs the well-known principle of the fly ball governor. Thus as the pot rotates upon its flexible bearing 27, the balancing mass 14 will develop a centrifugal force in a horizontal radial direction which will counteract any tendency of the pot to vibrate or wabble in a vertical or non-horizontal direction.

Furthermore, while by placing the pivot point 18 which is the center of the bearing 27 below the center of the balancing mass 14, I permit of gyration of the spin pot in response to disturbing forces that tend to tilt and vibrate it, still, I limit the radius of gyration to a distance extending vertically from the point 18 to a point in a plane passing through the center of the revolving mass 14. If greater freedom of gyration is desirable, this radius can be increased, and vice versa.

In Figure 7 I have shown a novel assembly of a battery of spin pots housed in an acid resisting casing composed of bakelite or the like, and comprising the bottom wall 60, the rear wall 61 and the front wall 62. A plurality of tops or covers 63 are hinged to the upper edge of the rear wall 61 as at 64 and are locked or secured in closed position by the latches 65. The bottom wall 60 is provided with gutters 66 wherein the acid exuding through the ports 3 collects and flows to a receptacle (not shown,) to be used again. The spin pot casing is detachably supported on a lower casing, composed of the bottom wall 67 and side walls 68 which houses the battery of driving motors 41, the driving elements of which pass upwardly through the bottom 60 of the upper casing which houses the battery of spin pots to drive the latter, the upper edges of the walls 68 being seated in longitudinal grooves 78.

70 designates a motor support having the legs 71 and the upper beveled recess or seat 72 which receives and engages the edges of the bases 77 of the motors 41, the latter being secured to said motor support by the screws 73, as will be apparent from Figures 7 and 8. The support 70 is provided with electrical contacts 74, which contact with the contacts 75 in the base 77 of motors 41 when the latter are in position. By thus having permanently wired motors 41 which are adapted to be positioned in electrical contacting position with respect to a permanently wired support 70, I eliminate the necessity of connecting and disconnecting wires whenever one of the motors 41 is removed for inspection, replacement, adjustment or repair. When it is desired to remove the entire battery of motors or spin pots, or both, the upper casing which houses the spin pots is lifted bodily and as a unit from the lower casing housing the motors thus giving free access to spin pots and motors. Thus, a motor 41 is positioned on the support 70 with the contact 75 thereof in vertical alignment and contiguous with the contacts 74 in said support and the screws 73 are applied to hold the motor in position. By this construction batteries of motors and spin pots of any desired number can be assembled and disconnected in a very simple and expeditious manner.

It is to be further understood that while in Figure 2 I have shown a preferred construction of a driving spindle for rotating the spin pot, it is within the scope of my invention to employ other suitable driving devices, the distinctive feature of my present invention being the positioning of the driving means in the inverted cup-shaped portion 5 of the pot 1 with the center of rotation in the same horizontal plane with the center of gravity of the rotating pot.

Furthermore, while I have illustrated one preferred construction of a driving spindle having the flexible connection 18 and the flexible spherical bearing 26, it is within the scope of my invention to alter or omit these features if desired as stated.

It will be understood that the arms 55, which operate the servels 11 are actuated in any conventional manner, and while I have shown the driving shaft or spindle 17 as actuated by an electric motor, any other conventional source of power or prime motor may be employed.

While I have described the spin pot as being made of bakelite or the like, it is evident that it may be made of hard rubber or any other suitable acid resisting material. In some instances, in the practical operation of my novel device, it may be desired to remove the spin pot without stopping the rotation of the driving shaft 17, in which case I may omit the bayonet joint connection seen in Figures 3 to 5, and assemble the spin pot upon its driving head 21 as seen in Figures 1 and 2, without the interposition of the bayonet joint, the frictional contact between the contiguous conical surfaces 51 and 52 enabling the spin pot and driving head to rotate as a unit. The bayonet joint connection will, however, positively prevent the spin pot from disengagement with its driving means, under all conditions as is evident.

It will be evident that my novel spin pot can be effectively rotated by a one piece driving shaft carrying the driving head 21, and that changes may be made in the ball bearings, spherical head, sealing devices and their adjuncts, and that some of these elements may be omitted without departing from the spirit of my invention.

My novel construction seen in Figures 1 and 7 reduces the overall height of the combined spin pot and motor more than one half, as compared with the height of the present conventional installations, which is a very advantageous feature of construction in devices of this character.

In the construction seen in Figure 10, I have shown a different form of servel 80, which is of the shape of an inverted funnel which may be made of suitable material having the neck slightly contracted at 82 and its lower edge rounded at 81, to facilitate the movement of the filament 54, the travel of said filament therethrough being indicated in dotted lines. In this construction of servel, the lower, larger end thereof straddles the conical upwardly extending base portion of the spin pot.

It will now be apparent that I have devised a novel and useful construction of spin pot and actuating mechanism therefor which embodies the features of advantage enumerated as desirable in the statement of the invention and the above description and while I have in the present instance shown and described the preferred embodiment thereof which has been found in practice, to give satisfactory and reliable results, it is to be understood that the same is susceptible of modification in various particulars without departing from the spirit or scope of the invention or sacrificing any of its advantages.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent, is:—

1. A spin pot having its central reentrant base portion in the form of an inverted cup extending upwardly to about the midheight of said pot to a point intermediate the top edge and base thereof.

2. A spin pot having its central reentrant base portion in the form of an inverted conical cup, extending upwardly to a point intermediate the top and base thereof at approximately the mid height of said pot.

3. A spin pot having an annular side wall provided with drain ports, and with an annular enlarged mass coincident with the horizontal axis of the center of gravity of said pot.

4. A spin pot having an annular side wall provided with drain ports, an annular enlarged mass positioned coincident with the horizontal axis of the center of gravity of the mass, and an annular metallic ring cast in said mass to increase the weight thereof.

5. A spin pot having a central re-entrant base portion in the form of an inverted conical cup and having an annular apertured wall provided with an enlarged annular mass formed thereon midway of its height.

6. A spin pot having an annular wall with an annular outer enlarged balancing and reinforcing mass formed thereon midway of its height, and a base for said spin pot having a central re-entrant portion in the form of an inverted conical cup for receiving driving and supporting means.

7. The combination of a spin pot having a central reentrant base portion in the form of an inverted conical cup extending to about the midheight of said pot, an outer wall for said spin pot, and a servel supported above said spin pot and having its lower exit end positioned out of contact with the junction of said inverted cup portion with the bottom of said spin pot.

8. A spin pot having a base provided with a central inverted reentrant conical cup portion and a servel for said spin pot comprising an inverted funnel having its lower end positioned above and around said inverted cup portion.

9. A spin pot having a base, the central portion thereof being of the shape of an inverted conical cup extending into said spin pot to about the mid height thereof, and a conical driving head positioned within said inverted cup shaped portion and in frictional contact therewith for rotating said spin pot.

10. A spin pot having a base and an annular wall provided with drain ports, the central portion of said base being of the shape of an inverted conical cup extending into the spin pot body, driving means for said spin pot positioned within said inverted cup-shaped portion, and a bayonet joint connection common to said driving means and the juxtaposed upper central portion of said base.

11. A spin pot having its base provided with a centrally disposed, inverted, conical reentrant cup, a conical driving head adapted to fit within said cup shaped portion and to contact with the inner walls thereof, a driving spindle and a flexible joint connection intermediate said driving head and said driving spindle for driving said spin pot.

12. A spin pot having the central portion of its base of an inverted conical cup shape, a driving head for said spin pot adapted to seat in said inverted cup shaped central portion, a driving spindle including upper and lower shafts connected by a flexible joint, said upper shaft being rigidly connected to said driving head, a tubular portion having its upper end below said driving head and its lower portion terminating in a spherical head, bearings for said spherical head, an outer casing therefor, and labyrinth seals for said casing and said bearings.

13. A spin pot having the central portion of its base of an inverted conical cup shape, a driving head for said spin pot, a driving spindle having a flexible joint with a short extension above said joint seated in said driving head, an upper ball bearing positioned in said driving head, a sleeve having its upper portion within said upper ball bearing and its lower portion terminating in a spherical head concentric with said universal joint, bearings for said spherical head, an outer casing therefor, seals coacting with said casing and forming a seal at the bottom surface of said driving head, a closure for the lower portion of said outer casing and a ball bearing for the lower portion of said driving spindle.

14. The combination of a spin pot, a driving head engaging with the bottom thereof, a driving spindle having a flexible joint therein, and its upper portion engaging said driving head, an upper ball bearing positioned in said driving head, a spherical member surrounding said flexible joint and having an upper extension engaging said upper ball bearing, concave seats for said spherical head, and a stationary outer casing enclosing said concave seats.

15. The combination of a spin pot, a driving head engaging the bottom thereof, a driving spindle having a flexible joint therein, and its upper portion engaging said driving head, an upper ball bearing positioned in said driving head, a spherical head surrounding said flexible joint and having an upper extension engaging said ball bearing, concave seats for said spherical head, a stationary support for said concave seats, an outer casing, and a seal intermediate the upper portion of said casing and the bottom of said driving head.

16. The combination of a spin pot, a driving head engaging the bottom thereof, a driving spindle having a flexible joint therein, and its upper portion engaging said driving head, an upper ball bearing positioned in said driving head, a spherical head surrounding said flexible joint and having an upper extension engaging said ball bearing, concave seats for said spherical head, a stationary outer casing for said concave seats, and a seal intermediate the upper portion of said casing and the bottom of said driving head, comprising an annular tongue engaging an annular groove in the bottom of said seal and packing in said groove.

17. The combination of a spin pot having a central upwardly extending conical concavity in the bottom thereof and an outer annular balancing mass on the outer wall thereof, driving means positioned in said conical concavity, and an upper ball bearing for said driving means coincident with the horizontal plane of said balancing mass.

18. The combination of a spin pot having a central, upwardly extending conical concavity in the bottom thereof extending to about the mid height thereof, and an annular balancing mass on the outer wall thereof, driving means positioned in said conical concavity, an upper ball bearing for said driving means coincident with the horizontal plane of said balancing mass, and a driving head at the top of said driving means, said ball bearing being positioned within said driving head.

19. The combination of a spin pot having a central, upwardly extending conical concavity in the bottom thereof and an annular balancing mass on the outer wall thereof, flexible driving means positioned in said conical concavity, an upper ball bearing for said driving means coincident with the horizontal plane of said balancing mass, a driving head actuated by said driving means, an outer casing for said driving means, and a seal interposed between said outer casing and said driving head.

20. The combination of a spin pot having a central, conical concavity in the bottom thereof and an annular balancing mass on the outer wall thereof, a driving head positioned in said conical concavity, a driving spindle for said head, an upper ball bearing for said driving head coincident with the horizontal plane of said balancing mass, an outer casing below said driving head, a seal interposed between the upper end of said casing and said driving head, said upper ball bearing being positioned within said driving head, and a lower ball bearing for said driving spindle.

21. In a device of the character stated, a rotatable element, comprising a spin pot, having a central reentrant base portion extending to about the mid height of said pot, driving means therefor, and mechanism intermediate said rotatable element and said driving means permitting the rotatable mass center automatically to adjust itself independently of said driving means.

22. The combination of a spin pot having its central base portion extended upwardly, and a servel therefor having the contour of an inverted funnel, the lower flaring portion of said servel being adapted to extend over and receive said upwardly extending central base portion of said spin pot.

WALTER SCOTT MUMFORD.